United States Patent [19]
Lundin et al.

[11] 3,943,595
[45] Mar. 16, 1976

[54] WINDSHIELD WIPER

[75] Inventors: Lars Erik Lundin, Vastervik;
Dzintars Illmars Vieglins, Gamleby, both of Sweden

[73] Assignee: Aktiebolaget Electrolux, Lilla Essingen, Sweden

[22] Filed: Mar. 27, 1975

[21] Appl. No.: 562,783

[30] Foreign Application Priority Data
Mar. 29, 1974 Sweden............................7404250

[52] U.S. Cl. ....... 15/250.23; 15/250.19; 15/250.35; 15/250.36
[51] Int. Cl.² ........................................... B60S 1/32
[58] Field of Search....... 15/250.13, 250.19, 250.21, 15/250.23, 250.3, 250.36, 250.42

[56] References Cited
UNITED STATES PATENTS

| | | | |
|---|---|---|---|
| 1,694,245 | 12/1928 | Baker et al. ...................... | 15/250.23 |
| 3,551,938 | 1/1971 | Yonke .............................. | 15/250.23 |
| 3,671,994 | 6/1972 | Breitschwerdt et al........... | 15/250 A |

*Primary Examiner*—Peter Feldman
*Attorney, Agent, or Firm*—Alfred E. Miller

[57] ABSTRACT

A windshield wiper for a motor vehicle which performs a swinging-wiping movement across a rectangular-shaped windshield between end positions that are located adjacent to one of the long sides of the rectangular windshield. The wiper blade is constructed and arranged to have the operative length thereof varied during the wiping movement whereby in the central position the blade is substantially equal to the length of one of the short sides of the rectangular-shaped windshield. In other sectors of the surface to be wiped, the wiper blade is of a greater length.

4 Claims, 2 Drawing Figures

WINDSHIELD WIPER

BACKGROUND OF THE INVENTION

In known windshield wipers for vehicles, the wiper blade normally sweeps over a sector of the windshield in which the radial extension is determined by the length of the short side of the rectangular surface of the windshield. In order to increase the wiping area outside of the sector, the wiper blade may be made to slide in its length direction at the same time it performs its swinging-wiping movement. Thus, by a choice of a suitable swinging and sliding movement the windshield surfaces that are wiped constitute a substantially rectangular shape. However, the construction and arrangement necessary for operating the wiper blade with a combination swinging and sliding movement is often complex and expensive to manufacture. Another disadvantage of this construction is that the complex structure materially reduces the functional reliability of the wiping device.

A windshield wiper is also known in which the wiper blade is supported by a holder consisting of two parts movably connected to each other, and located flush with the windshield. In this construction, the wiper blade is divided into two portions which, for adjustment of the operative length of the wiping blade to the shape of the wiped surface, makes a maximum angle of 90° with each other. It should be evident that the severe bending of the wiper blade may lead to stresses in wiper blade and consequently causing the wiper blade to break. Obviously, this construction results in a shorter life of the wiper blade compared to conventional wiper blades.

SUMMARY OF THE INVENTION

The invention relates to a windshield wiper for a vehicular windshield in which the wiper blade has an operative length that can be varied during the wiping movement.

An object of the present invention is to provide a windshield wiper device which is relatively simple in construction but reliable in operation.

A further object of the present invention is to provide a wiper blade that in the centrally located area of the windshield extends beyond a long side of the rectangular windshield, and the portion of the wiper blade situated outside the surface of the windshield is lifted above said surface and thereby substantially reduces the stress on said blade.

The invention will now be more fully described with reference to the accompanying drawings, in which:

FIG. 1 is a front elevational view of a windshield wiper device constructed in accordance with our teachings and FIG. 2 is a sectional view taken along the lines II — II of FIG. 1.

DESCRIPTION OF THE PREFERRED EMBODIMENT

Figure 1:
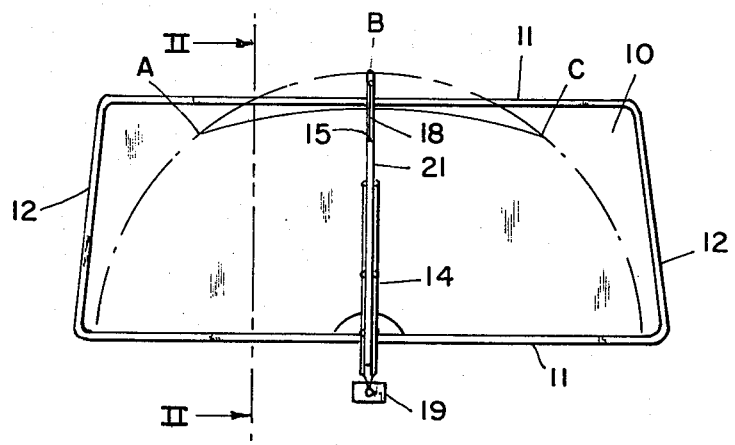

As seen in the figures, a windshield wiper is shown for use with a substantially rectangular windshield 10 provided with long sides 11 and short sides 12. A drive shaft 13 is rotatably journalled at a location below the lower long side 11 of the windshield 10. The drive shaft is caused to rotate back and forth by a driving means (not shown) which movement is transmitted by means of a wiper arm 14 to a wiper blade 15. The latter is preferably fabricated of rubber and is attached to the wiper arm by means of a holder 16. It should be noted that the wiper blade 15 is moved between two end positions adjacent to the lower long side 11 on each side of the drive shaft 13.

Figure 2:
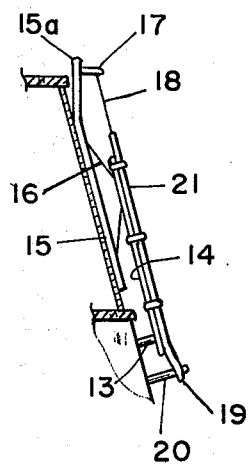

Referring to FIG. 1, the wiper blade 15 is a single blade and in order to satisfactorily clean the windshield 10 this blade must have a length which in its centrally situated area, between the end positions thereof, extends beyond the upper long side 11 of the windshield 10. In many cases, the windshield is provided with a somewhat elevated frame, such as a rubber and chromium windshield edge-frame. In order to avoid the possibility that the end of the wiper blade 15 comes into contact with the frame and rapidly wears out the end portion 15a, the wiper blade 15 is arranged to be lifted so as to be elevated over the windshield frame at the upper long side of the windshield. In order to accomplish this purpose the end portion 15a of the wiper blade 15 has a pin 17, to the free end of which a cord 18 is attached. As seen in FIG. 2, the opposite end of the cord is attached to an end fitting 19 that is rotatably supported on a shaft 20. The latter shaft extends parallel to the drive shaft 13. Furthermore, the shaft 20 is located below the drive shaft 13 so that a line through shafts 13 and 20 extends through the central area of the windshield and divides the surfaces to be wiped into two mainly identical sections. A sleeve 21 is provided to guide the cord 18 and is located between the attachment points of both ends of the cord and secured to the wiper arm 14. As is well known, the wiper blade 15 is reinforced by a metal strip (not shown) which is resilient in the direction of lift of the wiper blade portion 15a. The latter will be urged toward a position in line with the remainder of the wiper blade because of the resilient effect of the metal strip.

A desired course of movement of the windshield wiping device can be achieved by means of a choice of a suitable cord length and positioning of the drive shaft 13 relative to the shaft 20. It will be observed from FIG. 1 that the wiper blade 15, when it moves from the left end position to the right end position, is not acted upon by the cord 18 until it reaches the point A. At the point A the cord 18 commences to stretch whereby the wiper blade portion 15a starts to lift, and this lifting action continues on through point B and finally the wiper blade portion 15a is lowered at point C, at which point the action of the cord on the wiper blade portion ceases. However, the wiper blade continues to move until it comes to the right end position without being acted upon by the cord 18. It should be apparent that the wiper blade portion 15a can move from its right end position to the left end position and follow a corresponding course of movement, as set forth hereinabove.

The length of the life of the wiper blades constructed and arranged in accordance with the invention is substantially the same as the length of the life of the conventional wiper blades, since the outer edge of the present wiper blade is lifted only a small amount over the edge-defining surface of the windshield, and therefore the stress imposed on the blade is negligible.

What is claimed is:

1. A windshield wiper for a rectangular-shaped windshield comprising a wiper blade adapted to perform a swinging-wiping movement between spaced end positions located adjacent to one of the long sides of said rectangular-shaped windshield to produce a wiped surface, said wiper blade having an operative length that varies during the wiping movement of said wiper blade, said wiper blade in the central sector of the wiped surface between said end positions having an effective length which is substantially equal to the length of a short side of said windshield while said wiper blade in the other sectors of said wiped surface is greater in length, and said wiper blade in said central sector having a portion thereof extending beyond the other of said long sides of the rectangular-shaped windshield, and means for lifting said portion of the wiper blade located outside of said windshield above and without coming in contact with the latter while the remaining portion of the blade remains in contact with the windshield.

2. A windshield wiper as claimed in claim 1 further comprising a flexible line comprising a cord connecting said portion of the wiper blade to an attachment member that is located outside said wiped surface and below said one long side of the rectangular-shaped windshield, and a drive shaft for said wiper blade which is also positioned below said one long side of the rectangular-shaped windshield, said attachment member being located at a greater distance from said wiped surface than said drive shaft.

3. A windshield wiper as claimed in claim 2, wherein an imaginary line drawn through said attachment member and said drive shaft extends through said central sector and divides said wiped surface into two substantially identical sections.

4. A windshield wiper as claimed in claim 2 further comprising a sleeve that is secured to said wiper arm, said cord being retained in said sleeve, and the other end of said cord being secured to said attachment member which is a shaft positioned substantially parallel to said drive shaft.

* * * * *